United States Patent
Venter et al.

(10) Patent No.: US 11,891,184 B2
(45) Date of Patent: Feb. 6, 2024

(54) AIRCRAFT HYBRID PROPULSION SYSTEM

(71) Applicants: ROLLS-ROYCE plc, London (GB); ROLLS-ROYCE DEUTSCHLAND LTD & CO KG, Blankenfelde-Mahlow (DE)

(72) Inventors: Gideon Daniel Venter, Berlin (DE); Giles E Harvey, Derby (GB)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 166 days.

(21) Appl. No.: 17/098,758

(22) Filed: Nov. 16, 2020

(65) Prior Publication Data
US 2021/0179282 A1 Jun. 17, 2021

(30) Foreign Application Priority Data
Dec. 12, 2019 (GB) .................................. 1918282

(51) Int. Cl.
 B64D 27/02 (2006.01)
 B64D 27/10 (2006.01)
 (Continued)

(52) U.S. Cl.
 CPC ............ B64D 27/02 (2013.01); B64D 27/10 (2013.01); B64D 27/24 (2013.01); F02C 6/20 (2013.01);
 (Continued)

(58) Field of Classification Search
None
See application file for complete search history.

(56) References Cited

U.S. PATENT DOCUMENTS 4,139,780 A * 2/1979 Hucker ................. H02H 7/093
 290/8
8,314,505 B2 * 11/2012 McLoughlin ............ F02C 7/36
 290/46
(Continued)

FOREIGN PATENT DOCUMENTS

EP 3530928 A1 8/2019
EP 3556659 A1 10/2019

OTHER PUBLICATIONS

Apr. 23, 2021 Extended European Search Report issued in European Patent Application No. 20207060.3.
(Continued)

*Primary Examiner* — Jason H Duger
(74) *Attorney, Agent, or Firm* — Oliff PLC

(57) ABSTRACT

An aircraft hybrid propulsion system (5) comprises an internal combustion engine (10) comprising a main drive shaft (24), an electric machine (28) comprising an electric machine rotor (78), a propulsor (12) mounted to a propulsor shaft (62), and a clutch arrangement configured to selectively couple each of the gas turbine engine main drive shaft (24) and electric machine rotor (78) to the propulsor drive shaft (62). The electric machine rotor (78) is mounted coaxially with the main drive shaft (24) and the clutch arrangement comprises a first overrunning clutch (52) configured to couple the main drive shaft (24) to the propulsor drive shaft (62), and a second overrunning clutch (54) configured to couple the electric machine rotor (78) to the propulsor drive shaft (62).

14 Claims, 4 Drawing Sheets

(51) Int. Cl.

| | | |
|---|---|---|
| *B64D 27/24* | (2006.01) | |
| *F02C 6/20* | (2006.01) | |
| *F02C 7/36* | (2006.01) | |
| *H02K 7/108* | (2006.01) | |
| *H02K 7/116* | (2006.01) | |
| *H02K 7/18* | (2006.01) | |
| *H02K 7/20* | (2006.01) | |
| *H02K 11/00* | (2016.01) | |
| *F16D 7/00* | (2006.01) | |
| *F16H 57/02* | (2012.01) | |

(52) U.S. Cl.
CPC ............. *F02C 7/36* (2013.01); *H02K 7/108* (2013.01); *H02K 7/116* (2013.01); *H02K 7/1823* (2013.01); *H02K 7/20* (2013.01); *H02K 11/0094* (2013.01); *B64D 2027/026* (2013.01); *F05D 2220/323* (2013.01); *F05D 2220/76* (2013.01); *F16D 7/007* (2013.01); *F16H 57/02* (2013.01); *F16H 2057/02043* (2013.01)

(56) References Cited

U.S. PATENT DOCUMENTS

| 10,968,825 B2* | 4/2021 | Mackin .................. F02C 3/305 |
| 2012/0076674 A1 | 3/2012 | Nomura et al. |
| 2016/0069400 A1* | 3/2016 | Mordukhovich ....... F16D 41/04 192/43.1 |

OTHER PUBLICATIONS

Sep. 24, 2020 Search Report issued in British Patent Application No. 1918282.3.

\* cited by examiner

AIRCRAFT HYBRID PROPULSION SYSTEM

The present disclosure concerns a parallel hybrid propulsion system for an aircraft and an aircraft comprising the propulsion system.

Parallel hybrid aircraft have been proposed, in which an internal combustion engine is combined with one or more electric motors to drive one or more propulsors. Parallel hybrid systems can be distinguished from so-called "serial hybrid" systems, in that in a parallel hybrid system, a mechanical connection is provided between the internal combustion engine and at least one propulsor, with at least one electric motor driving either the same propulsor as that driven by the internal combustion engine, or a further propulsor.

According to a first aspect there is provided an aircraft hybrid propulsion system comprising;
an internal combustion engine comprising a main drive shaft;
an electric machine comprising an electric machine rotor;
a propulsor mounted to a propulsor shaft; and
a clutch arrangement configured to selectively couple each of the gas turbine engine main drive shaft and electric machine rotor to the propulsor drive shaft;
wherein
the electric machine rotor is mounted coaxially with the main drive shaft; and
the clutch arrangement comprises a first overrunning clutch configured to couple the main drive shaft to the propulsor drive shaft, and a second overrunning clutch configured to couple the electric machine rotor to the propulsor drive shaft.

Advantageously, a single propulsor can be driven by either or both of the internal combustion engine and the electric motor. Furthermore, in the event of a failure of either the electric motor or internal combustion engine, the propulsor can continue to be driven by the other input, in view of the clutch arrangement.

Each of the main shaft, propulsor shaft and machine rotor shaft may be coaxial with one another.

The main shaft may be provided radially inward of the electric machine rotor. Alternatively, the main shaft may be provided radially outward of the electric machine rotor. The propeller drive shaft may be located between the electric machine rotor and main shaft.

The propulsor shaft may be coupled to a radially outer race of the first overrunning clutch, and may be coupled to a radially inner race of the second overrunning clutch. Alternatively, the propulsor shaft may be coupled to a radially inner race of the first overrunning clutch, and may be coupled to a radially outer race of the second overrunning clutch.

The electric motor may comprise one of a permanent magnet motor and an induction motor. The inventors have found that the present invention is suitable for a wide variety of motor types, but it particularly suitable for permanent magnet motors. In the event of a permanent magnet motor failure, it is important that the electric motor does not continue to turn. By providing an overrunning clutch, the propulsor can continue to turn, while preventing the motor from turning.

The first overrunning clutch may be configured to couple the main engine shaft to the propulsor drive shaft when torque is applied by the main engine shaft to the propulsor drive shaft in a first direction relative to the propulsor drive shaft, and decouple the main engine shaft from the propulsor drive shaft when torque is applied in a second direction. The second overrunning clutch may be configured to couple the electric machine rotor to the propulsor drive shaft when torque is applied by the electric machine to the propulsor drive shaft in the first direction relative to the propulsor drive shaft, and decouple the electric machine from the propulsor drive shaft when torque is applied in the second direction.

The propulsor drive shaft may be coupled to the propulsor via a reduction gearbox. Advantageously, a relatively fast turning internal combustion engine and/or electric motor can be used in combination with a relatively slow turning propulsor. Such an arrangement provides for relatively efficient, compact electric motors and internal combustion engines, as well as an efficient propulsor.

The reduction gearbox may comprise an epicyclic gearbox.

The aircraft hybrid propulsion system may comprise one or more of an electric energy storage device and a generator configured to provide electrical power to the electric motor. The generator may be coupled to the internal combustion engine.

The internal combustion engine may comprise a gas turbine engine. The gas turbine engine may comprise a compressor coupled to a first turbine, and may comprise a second turbine. The second turbine may be de-coupled from an engine compressor. The first and/or second turbine may be coupled to one or both of the generator and the combining gearbox.

According to a second aspect there is provided an aircraft comprising the propulsion system of the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

An embodiments will now be described by way of example only, with reference to the Figures, in which.

Figure 1:
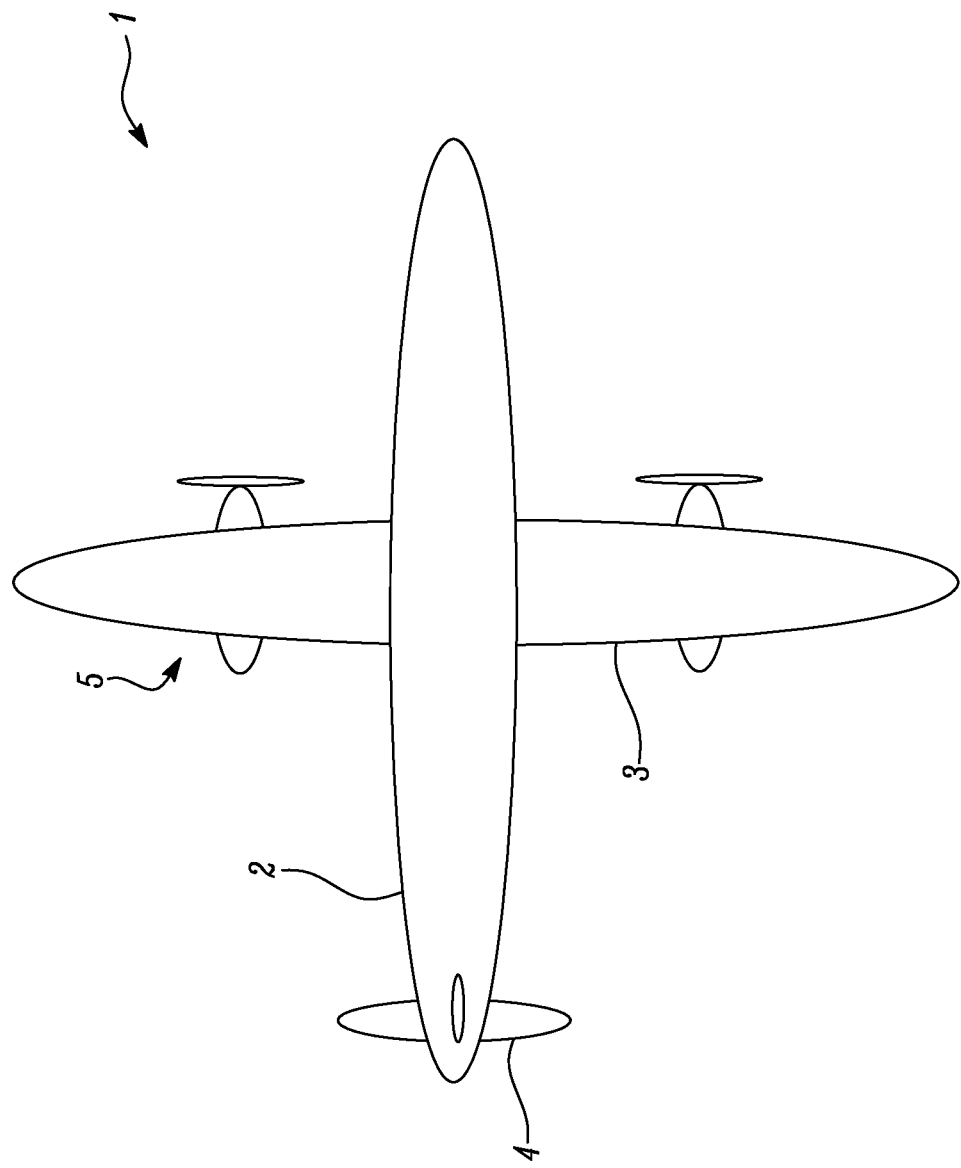
FIG. 1 is a plan view of an aircraft comprising a parallel hybrid propulsion system.

With reference to FIG. 1, an aircraft 1 is shown. The aircraft 1 is of conventional configuration, having a fuselage 2, wings 3, tail 4 and a pair of propulsion systems 5. One of the propulsion systems 5 is shown in detail in FIG. 2.

Figure 2:
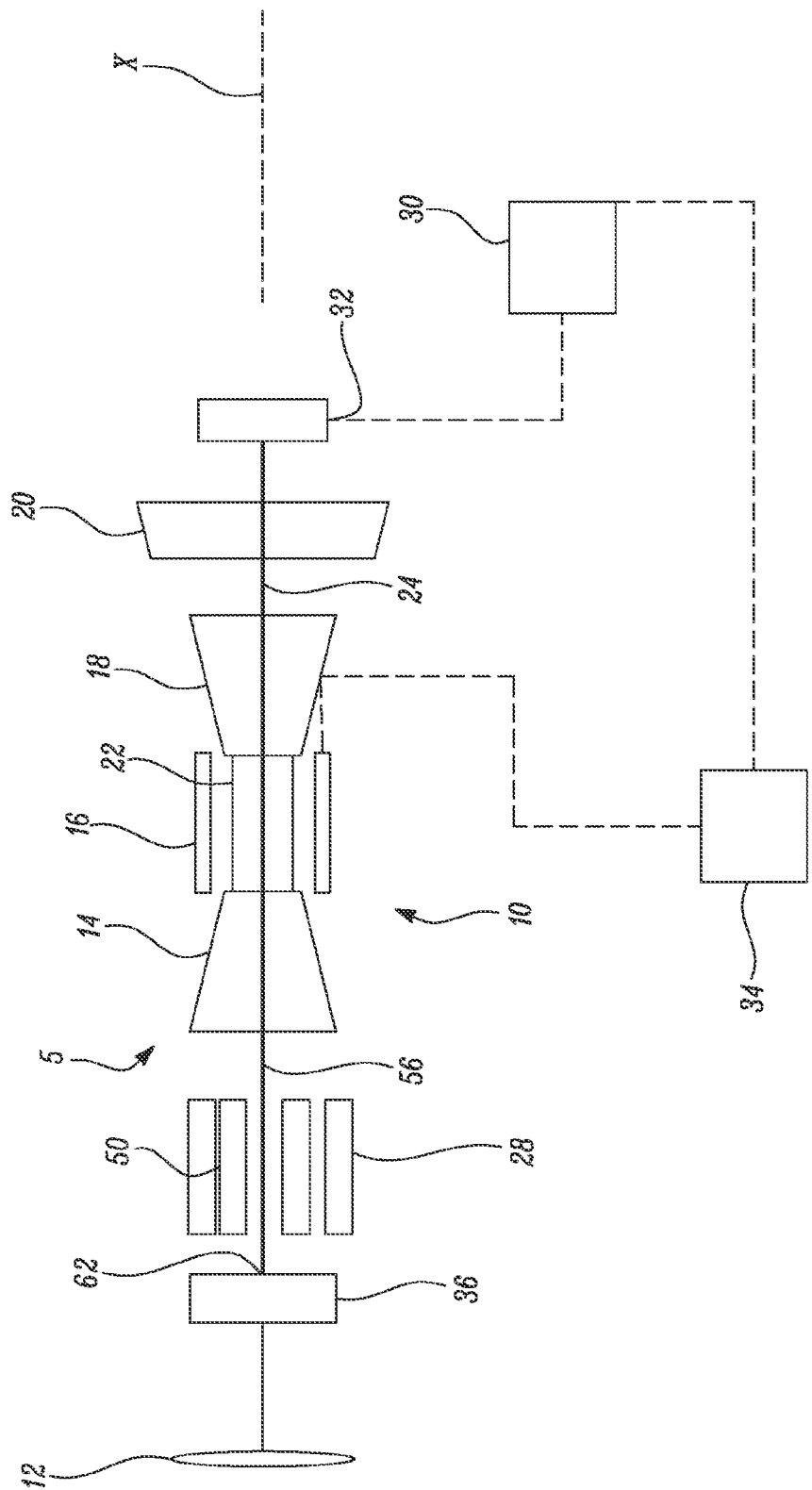
FIG. 2 is a schematic diagram of a parallel hybrid propulsion system for the aircraft of FIG. 1.

FIG. 2 shows the propulsion system 5 schematically. The propulsion system 5 includes an internal combustion engine in the form of a gas turbine engine 10. The gas turbine engine 10 comprises, in axial flow series, a compressor 14, combustion equipment 16 and high and low-pressure turbines 18, 20.

The gas turbine engine 10 works in the conventional manner so that air flows through the compressor 14 where it is compressed, before delivering that air to the combustion equipment 16, where it is mixed with fuel and the mixture combusted. The resultant hot combustion products then expand through, and thereby drive the turbines 18, 20 before being exhausted through a nozzle. The high 18 and low-pressure turbines 20 drive respectively the compressor 14 and a propulsor 12 in the form of a propeller or fan, each by suitable interconnecting main engine shaft 22, 24, which rotate about an axis of rotation X. The low-pressure shaft 24 is coupled to the propulsor 12 via a clutch arrangement 50 and an optional reduction gearbox 36. The gearbox 36 could be of any suitable type, such as an epicyclic gearbox.

Other gas turbine engines to which the present disclosure may be applied may have alternative configurations. By way of example such engines may have an alternative number of interconnecting shafts (e.g. three) and/or an alternative number of compressors and/or turbines. Further, the engine may comprise a gearbox provided in the drive train from a turbine to a compressor and/or fan.

The propulsion system 5 further comprises one or more electrical machines driving the propulsor 12. In particular, the system 5 comprises an electric motor 28. The motor 28 is of a conventional type, such as an induction or permanent magnet electric machine, and is configured to drive a propulsor such as the fan 12. In the present embodiment, the motor 28 comprises a permanent magnet AC motor, and is coupled to the fan 12 via a motor shaft 56, clutch arrangement 50, and reduction gearbox 36, which will be described in further detail later.

Figure 4:
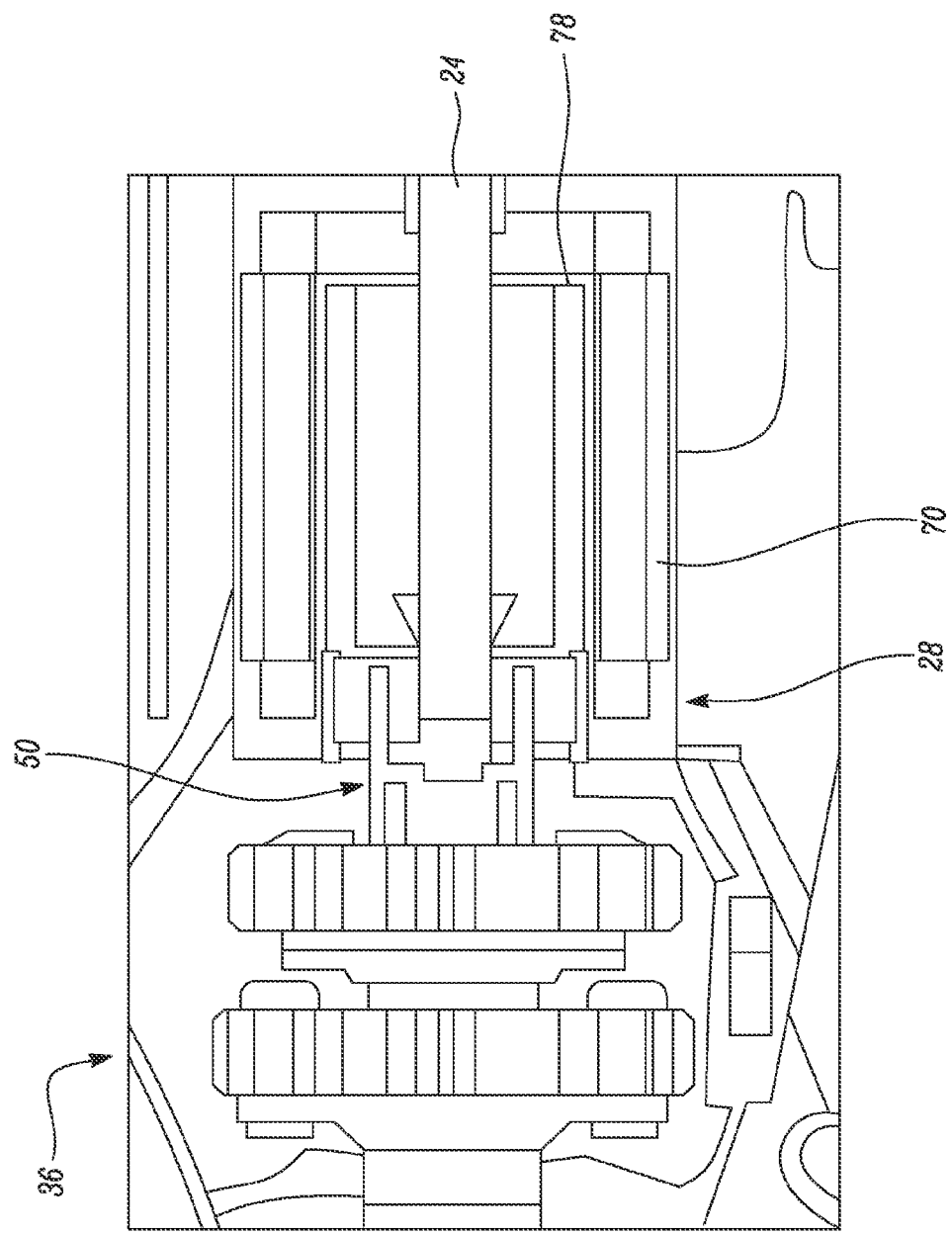
FIG. 4 is a schematic side view of the clutch arrangement of FIG. 3.

The electric motor 28 is shown in further detail in FIG. 4. The motor 28 is of conventional construction, comprising a stator 70 comprising a plurality of stator coils (not shown), which are energised in use to produce a rotating magnetic field. This rotating magnetic field crosses an air gap to link with a magnetic field produced by permanent magnets of a rotor 78. Consequently, the motor 28 acts as a motor when the stators 72 are energised. On the other hand, where the rotor 78 is rotated, the rotor permanent magnets produce a rotating magnetic field, which links with the stator windings 72 to produce an electric current, and so may act as a generator under some circumstances.

The electric motor 28 is positioned such that the stator 70 and rotor 78 surround a main engine shaft, which in this case comprises the low-pressure shaft 24. The motor 28 is of an "in-runner" type, in which the rotor 78 is provided radially inward of the stator 70. The rotor 78 is coupled to the low-pressure shaft 24 via the clutch arrangement 50, and is configured with an axis of rotation which is co-axial with the axis of rotation X of the low-pressure turbine 24.

The electric motor 28 is coupled to an energy storage device 30 in the form of one or more of a chemical battery, fuel cell, and capacitor, which provides the electric motor 28 with electrical power during operation. In some cases, multiple energy storages systems, which may be of different types (chemical battery, fuel cell etc) may be provided for each propulsion system 5. In other cases, a common energy storage device 30 may be provided for multiple propulsion systems.

The propulsion system further comprises a generator 32, which is electrically coupled to one or both of the motor 28 and the energy storage device 30, such that additional electrical energy can be provided in operation. The generator 32 is typically driven by the low-pressure shaft 24 of the gas turbine engine 10.

A controller 34 is provided, which is configured to control at least the motor 28 and energy storage device 30, to control the torque provided by the motor 28, and the charging/discharging of the energy storage device 30. The controller 34 may also be configured to control operation of the generator 32, to control electrical power produced by the generator 32.

As briefly mentioned, the gas turbine engine 10 and electric motor 28 are each coupled to the propulsor 12 via a clutch arrangement 50 comprising respective first and second overrunning clutches 52, 54 (also known as "freewheel" clutches).

Figure 3:
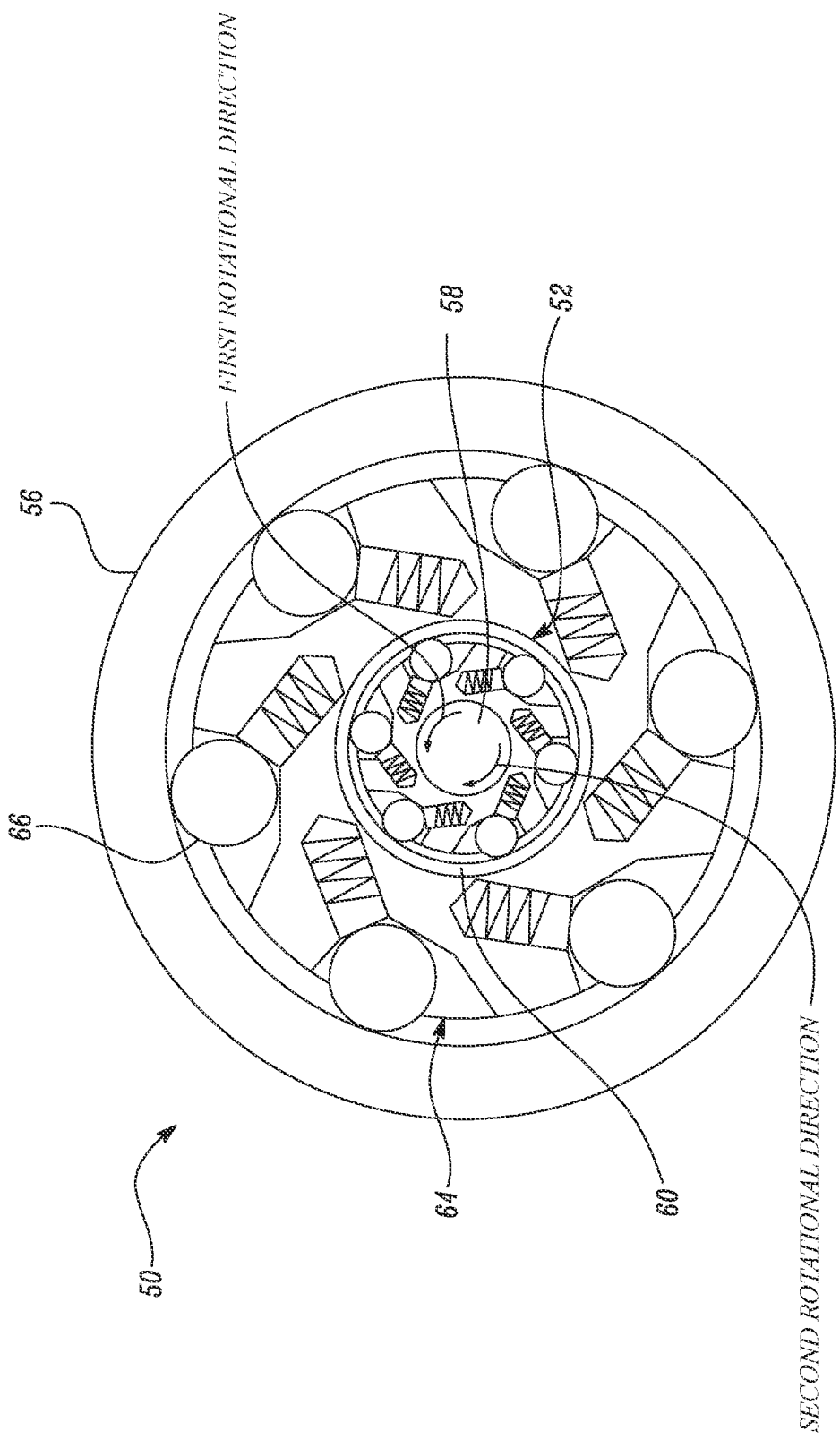
FIG. 3 is a schematic front view of part of a clutch arrangement of the hybrid propulsion system of FIG. 2.

FIG. 3 shows the clutch arrangement 50 in further detail. The clutch arrangement 50 comprises a first clutch in the form of a first overrunning clutch 52. The first clutch 52 comprises an inner race 58, which is coupled to the low-pressure shaft 24. An outer race 60 is provided, which is coupled to a fan shaft 62, which is in turn coupled to the fan 12 via the reduction gearbox 36.

The outer race 60 of the first overrunning clutch 52 also forms an inner race of the second overrunning clutch 54. The second overrunning clutch 54 further comprises an outer race 64, which is coupled to the motor shaft 56 and is provided radially outward of the outer race 60 of the first clutch 52.

Consequently, the propulsor 12 is coupled to both the main engine shaft 24 and electric machine 28 via the first and second overrunning clutches 52, 54 respectively. Each of the shafts 24, 56, 62 is co-axial, and the arrangement is radially nested, with the main engine shaft 24 being coupled to a radially innermost race 58, the outer race 60 of the first clutch 54 being provided radially outward and coupled to the propulsor shaft 62, and the outer race 64 of the second clutch 54 being provided at the radially outermost position, and coupled to the motor shaft 56. It will be understood that the shafts 24, 56 could instead be reversed, with the shaft 56 being nested inside the shaft 24.

The overrunning clutches 50, 52 are typically in the form of freewheel clutches, although other overrunning clutch types are known. The freewheel clutches 52, 54 comprises an input comprising the low-pressure shaft 24 of the gas turbine engine 10 and the motor shaft 56 respectively. An output shaft in the form of the propulsor shaft 62 is provided, which is coupled to the radially outer race of the first clutch 52, which forms the radially inner race of the second clutch 54. Between the respective races 58, 60 and 60, 64, are two sets of rollers 66, which engage against respective outer races 60, 64 when they are relatively rotated in one direction, and disengage when rotated in an opposite direction.

The first clutch 52 is arranged such that the races 58, 60, and so the shafts 24, 62 are locked together to transfer torque when torque is applied by the shaft 24 to the inner race 58 in a first direction, and when the speed of the input shaft 24 is equal to the speed of the output shaft 62. On the other hand, shafts 62, 24 rotate freely relative to one another, such that no torque is transmitted back to the input shaft 24, when the shaft 62 rotates at a higher speed in the first direction than the input shaft 24, or where the input shaft 24 rotates in a direction opposite to the first direction. Consequently, torque is transferred from the input shaft 24 to the shaft 62 only, and not the other way around. Similarly, the second clutch 54 is arranged such that the shafts 56, 62 are locked together to transfer torque when torque is applied by the shaft 56 to the outer race 60 in the first direction, and when the speed of the input shaft 56 is equal to the speed of the output shaft 62. On the other hand, shafts 56, 62 rotate freely relative to one another, such that no torque is transmitted back to the input shaft 56, when the shaft 62 rotates at a higher speed in the first direction than the input shaft 24, or where the input shaft 24 rotates in a direction opposite to the first direction. Consequently, the fan 12 may be powered by either or both of the gas turbine engine 10 via the low-pressure shaft, and the motor 28.

Since the shaft 56 is coupled to the outer race 64 of the second freewheel clutch 54, and the shaft 24 is coupled to the inner race 58 of the first freewheel clutch 52, the freewheel clutches 52, 54 are arranged "backwards" relative to one another. Consequently, rotation of the shaft 24 at a higher speed than the shaft 56 will causes the shafts 24, 62 to lock and rotate together, and also cause the shafts 56, 62 to unlock, to rotate independently of one another. Conversely, rotation of the shaft 56 at a higher speed than the shaft 24 will causes the shafts 56, 62 to lock and rotate together, and also cause the shafts 24, 62 to unlock, to rotate independently of one another As a consequence of the above arrangement, the shaft 62 will be driven by the shaft 24, 56 having the highest rotational speed relative to the other shaft 56, 24. Consequently, one shaft 56, 24 can be driven to provide for rotation of the output shaft 62, without causing rotation of the other shaft 24, 56.

For example, in a first operational mode, the gas turbine engine 10 is used to drive the propulsor 12 alone. In this mode, the windings 72 of the motor 28 are not energised with electrical power from either the generator 32 or the batteries 30. In this case, the first freewheel clutch 52 engages in view of the torque input from the low-pressure shaft 24. Consequently, rotation of the low pressure shaft 24 drives the propulsor 12 via the reduction gearbox 36. However, in this mode, the second clutch 54 disengages, in view of the rotation of the inner race relative to the shaft 56, and the non-rotation of the motor shaft 62. Consequently, the electric machine 28 is not driven. This is particularly advantageous where the electric motor 28 comprises a permanent magnet motor, since rotation of the rotor 78 would normally generate electrical current. This may not be desirable, as this will reduce the amount of power available to drive the propulsor 12, and will also generate additional heat. This mode of operation is also useful where the motor 28 has suffered a fault. Consequently, the motor 28 does not have to be of a "fault tolerant" type, which may reduce cost and weight.

In a second operational mode, the motor 28 is used to drive the propulsor 12 alone. In this mode, the gas turbine engine 10 is shut-down. In this case, the second freewheel clutch 54 engages in view of the torque input from the motor 28, and the load imposed by the propulsor 12. Consequently, rotation of the motor 28 drives the propulsor 12 via the reduction gearbox 36. However, in this mode, the first clutch 52 disengages, in view of the rotation of the shaft 62, and the non-rotation of the low pressure shaft 24. Consequently, the gas turbine engine 10 is not driven. This mode of operation allows the gas turbine engine 10 to be shut-down in flight. Since gas turbine engines are only efficient when operated at high power, this may reduce overall fuel usage. Furthermore, the propulsor 12 can continue to be driven by the electric motor 28 in the event of a failure of the gas turbine engine 10, even where the gas turbine engine is not able to rotate due to the failure. Again, this increases safety, and improves operational flexibility.

In a third operational mode, the gas turbine engine 10 and the motor are used to drive the propulsor 12 together. In this mode, the windings 72 of the motor 28 are energised with electrical power from either the generator 32 or the batteries 30, and the gas turbine engine 10 is also operated to generate torque. In this case, both clutches 52, 54 engage in view of the torque input from the low pressure shaft 24 and the motor 28, which causes shafts 24, 56 to rotate at the same speed. Consequently, rotation of the low pressure shaft 24 and the motor 28 drive the propulsor 12 via the reduction gearbox 36. In this mode, load is shared between the gas turbine engine 10 and motor 28. This mode is particularly advantageous for operation at high power levels, such as take-off, where increased power is required.

Consequently, the present arrangement describes a lightweight, reliable aircraft propulsion system, which is flexible, efficient, and tolerant of failures. The system allows for provision of an electric machine that is co-axial with the main gas turbine engine shaft, while providing for automatic connection and disconnection of the gas turbine engine and electric machine under various circumstances. Such a system is compact. No additional actuation is required, which makes the system lightweight and reliable.

Except where mutually exclusive, any of the features may be employed separately or in combination with any other features and the disclosure extends to and includes all combinations and sub-combinations of one or more features described herein.

It will be understood that various modifications could be made to the system, without departing from the scope of the invention, as laid out in the claims.

For instance, the gas turbine engine could take a different form. For instance, the gas turbine engine could comprise additional compressors, which may be driven by one or more of the shafts, or by additional, independently rotatable shafts. Different forms of overrunning clutches could be used. The reduction gearbox could be omitted, as could the generator, with the electric machine being supplied with electric power from an energy storage device alone.

Different electric machine types could be employed, such as induction motors. Similarly, the electric machine could take a different physical form, being an "out runner", in which the electric machine rotor is provided radially outward of the stator, or the electric machine could comprise an axial flux machine.

The invention claimed is:

1. An aircraft hybrid propulsion system comprising;
   an internal combustion engine comprising a main drive shaft;
   an electric machine comprising an electric machine rotor;
   a propulsor mounted to a propulsor shaft; and
   a clutch arrangement configured to selectively couple each of the main drive shaft and the electric machine rotor to the propulsor shaft; wherein
   the electric machine rotor mounted coaxially with the main drive shaft; and
   the clutch arrangement comprises
   a first overrunning clutch that couples the main drive shaft to the propulsor shaft when torque is applied by the main drive shaft to the propulsor shaft in a first rotational direction relative to the propulsor shaft, and cannot transmit torque in a second rotational direction because the main drive shaft is decoupled from the propulsor shaft in the second rotational direction, and
   a second overrunning clutch that couples the electric machine rotor to the propulsor shaft when torque is applied by the electric machine to the propulsor shaft in the first rotational direction relative to the propulsor shaft, and cannot transmit torque in the second rotational direction because the electric machine is decoupled from the propulsor shaft in the second rotational direction.

2. An aircraft hybrid propulsion system according to claim 1, wherein each of the main drive shaft, the propulsor shaft and a shaft of the electric machine rotor are coaxial with one another.

3. An aircraft hybrid propulsion system according to claim 1, wherein the main drive shaft is radially inward of the electric machine rotor, or the main drive shaft is radially outward of the electric machine rotor.

4. An aircraft hybrid propulsion system according to claim 2, wherein the propulsor shaft is between the electric machine rotor and the main drive shaft.

5. An aircraft hybrid propulsion system according to claim 1, wherein the propulsor shaft is coupled to a radially outer race of the first overrunning clutch.

6. An aircraft hybrid propulsion system according to claim 1, wherein the propulsor shaft is coupled to a radially inner race of the first overrunning clutch, and is coupled to a radially outer race of the second overrunning clutch.

7. An aircraft hybrid propulsion system according to claim 1, wherein the electric machine comprises a permanent magnet motor.

8. An aircraft hybrid propulsion system according to claim 1, wherein the propulsor shaft is coupled to the propulsor via a reduction gearbox.

9. An aircraft hybrid propulsion system according to claim 8, wherein the reduction gearbox comprises an epicyclic gearbox.

10. An aircraft hybrid propulsion system according to claim 1, wherein the aircraft hybrid propulsion system comprises one or more of an electric energy storage device and a generator configured to provide electrical power to the electric machine.

11. An aircraft hybrid propulsion system according to claim 10, wherein the generator is coupled to the internal combustion engine.

12. An aircraft hybrid propulsion system according to claim 1, wherein the internal combustion engine comprises a gas turbine engine.

13. An aircraft comprising a hybrid propulsions system of claim 1.

14. An aircraft hybrid propulsion system according to claim 5, wherein the propulsor shaft is coupled to a radially inner race of the second overrunning clutch.

* * * * *